United States Patent
Westervelt

(10) Patent No.: US 10,913,921 B2
(45) Date of Patent: Feb. 9, 2021

(54) PERFORMANCE GEAR, TEXTILE TECHNOLOGY, AND CLEANING AND PROTECTING SYSTEMS AND METHODS

(71) Applicant: HEX PERFORMANCE, LLC, Arnold, MD (US)

(72) Inventor: Drew Westervelt, Baltimore, MD (US)

(73) Assignee: HEX PERFORMANCE, LLC, Arnold, MD (US)

(*) Notice: Subject to any disclaimer, the term of this patent is extended or adjusted under 35 U.S.C. 154(b) by 358 days.

(21) Appl. No.: 15/465,126

(22) Filed: Mar. 21, 2017

(65) Prior Publication Data

US 2017/0298306 A1 Oct. 19, 2017

Related U.S. Application Data

(63) Continuation-in-part of application No. 15/199,112, filed on Jun. 30, 2016, which is a continuation-in-part of application No. 14/743,758, filed on Jun. 18, 2015.
(Continued)

(51) Int. Cl.
*C11D 11/00* (2006.01)
*C11D 3/48* (2006.01)
(Continued)

(52) U.S. Cl.
CPC .......... *C11D 11/0064* (2013.01); *A01N 55/00* (2013.01); *C11D 1/38* (2013.01);
(Continued)

(58) Field of Classification Search
CPC .... C11D 3/00; C11D 3/30; C11D 3/37; C11D 3/50; C11D 3/373; C11D 11/0064;
(Continued)

(56) References Cited

U.S. PATENT DOCUMENTS 3,929,678 A * 12/1975 Laughlin .................. C07F 9/54
510/349
3,933,697 A 1/1976 Fujii et al.
(Continued)

FOREIGN PATENT DOCUMENTS

AU B-64753/94 * 6/1994 ................ C07F 7/08
JP 2006169163 A 6/2006
(Continued)

OTHER PUBLICATIONS

Wikipedia definition fabric softener, 2016, pp. 1-4.
(Continued)

*Primary Examiner* — Vasudevan S Jagannathan
*Assistant Examiner* — Preeti Kumar
(74) *Attorney, Agent, or Firm* — Finnegan, Henderson, Farabow, Garrett & Dunner, LLP

(57) ABSTRACT

A cleaning system for all laundry, high performance textiles, and sports gear, which includes a washing agent and a protective agent. The washing agent is configured to remove unwanted matter from the high performance textiles, sports gear, and/or other laundry. The protective agent is configured to create a bonded barrier comprising organosilane antimicrobial(s) on the high performance textiles, sports gear, and/or other laundry for protection against odors from bacteria, mold and mildew and/or the like. The washing agent and the protective agent are configured to be used in a two-step water-based treatment process in which the washing agent is provided in a given first step of the treatment process and the protective agent is provided in a given subsequent second step of the treatment process.

18 Claims, 7 Drawing Sheets

US 10,913,921 B2
Page 2

Related U.S. Application Data

(60) Provisional application No. 62/013,673, filed on Jun. 18, 2014.

(51) Int. Cl.
| | |
|---|---|
| C11D 3/20 | (2006.01) |
| C11D 3/50 | (2006.01) |
| C11D 3/386 | (2006.01) |
| C11D 3/00 | (2006.01) |
| C11D 1/38 | (2006.01) |
| C11D 1/66 | (2006.01) |
| D06L 1/16 | (2006.01) |
| D06M 13/46 | (2006.01) |
| D06M 13/513 | (2006.01) |
| A01N 55/00 | (2006.01) |
| D06M 16/00 | (2006.01) |
| C11D 3/37 | (2006.01) |
| C11D 1/835 | (2006.01) |

(52) U.S. Cl.
CPC ........... *C11D 1/66* (2013.01); *C11D 1/835* (2013.01); *C11D 3/0068* (2013.01); *C11D 3/2044* (2013.01); *C11D 3/2048* (2013.01); *C11D 3/2086* (2013.01); *C11D 3/373* (2013.01); *C11D 3/386* (2013.01); *C11D 3/38627* (2013.01); *C11D 3/38636* (2013.01); *C11D 3/48* (2013.01); *C11D 3/50* (2013.01); *C11D 11/0017* (2013.01); *D06L 1/16* (2013.01); *D06M 13/46* (2013.01); *D06M 13/513* (2013.01); *D06M 16/00* (2013.01); *D06M 16/003* (2013.01)

(58) Field of Classification Search
CPC .. C11D 1/38; C11D 1/66; C11D 1/835; C11D 3/2048; C11D 3/2086; C11D 11/0017; C11D 3/48; C11D 3/2044; C11D 3/386; C11D 3/38627; C11D 3/38636; C11D 3/0068; A01N 55/00; D06L 1/16; D06M 13/46; D06M 13/513; D06M 16/00; D06M 16/003
See application file for complete search history.

(56) References Cited

U.S. PATENT DOCUMENTS

| | | | |
|---|---|---|---|
| 3,986,987 A * | 10/1976 | D'Souza | C11D 3/046 510/345 |
| 4,005,028 A | 1/1977 | Heckert et al. | |
| 4,013,574 A | 3/1977 | Leikhim et al. | |
| 4,264,457 A | 4/1981 | Beeks et al. | |
| 4,446,035 A | 5/1984 | Barrat et al. | |
| 4,448,699 A | 5/1984 | Barrat et al. | |
| 4,557,854 A | 12/1985 | Plueddemann | |
| 5,411,585 A * | 5/1995 | Avery | A01N 55/00 106/287.1 |
| 5,948,383 A | 9/1999 | Kuznicki et al. | |
| 6,358,909 B1 | 3/2002 | Ochomogo | |
| 6,387,856 B1 | 5/2002 | Ofosu-Asante et al. | |
| 6,821,943 B2 | 11/2004 | Avery et al. | |
| 7,601,681 B2 * | 10/2009 | Smets | C11D 3/001 510/101 |
| 7,632,797 B2 | 12/2009 | Moses et al. | |
| 7,732,395 B2 | 6/2010 | Moses et al. | |
| 7,851,459 B2 | 12/2010 | McMahon | |
| 7,909,889 B2 * | 3/2011 | Charrier | A61K 8/31 132/202 |
| 8,008,245 B2 * | 8/2011 | Panandiker | C11D 3/373 510/276 |
| 8,211,849 B2 | 7/2012 | Molinaro et al. | |
| 8,318,037 B2 * | 11/2012 | West | C07F 7/083 252/62.2 |
| 8,329,632 B2 | 12/2012 | Mikkelsen et al. | |
| 8,343,903 B2 | 1/2013 | Whiteley | |
| 8,445,616 B2 | 5/2013 | Bergeron et al. | |
| 8,754,146 B2 | 6/2014 | Ziolkowski et al. | |
| 8,974,775 B2 | 3/2015 | Saxena et al. | |
| 2002/0151454 A1 | 10/2002 | Kischkel et al. | |
| 2002/0155981 A1 | 10/2002 | Kischkel et al. | |
| 2004/0102350 A1 | 5/2004 | Baker | |
| 2007/0237901 A1 | 10/2007 | Moses et al. | |
| 2008/0248968 A1 | 10/2008 | Gray et al. | |
| 2009/0069270 A1 | 3/2009 | McMahon | |
| 2009/0074971 A1 | 3/2009 | McMahon | |
| 2009/0298967 A1 | 12/2009 | Taylor et al. | |
| 2010/0093666 A1 | 4/2010 | Moses et al. | |
| 2011/0112005 A1 | 5/2011 | Brooker et al. | |
| 2012/0070481 A1 | 3/2012 | Bolkan et al. | |
| 2012/0196953 A1 | 8/2012 | Ziolkowski et al. | |
| 2013/0172193 A1 | 7/2013 | Saxena et al. | |

FOREIGN PATENT DOCUMENTS

| | | | | |
|---|---|---|---|---|
| WO | WO-0054587 A1 * | 9/2000 | ........... | A61Q 17/005 |
| WO | WO-0104248 A1 * | 1/2001 | ........... | C11D 3/2072 |
| WO | WO-2011049919 A1 * | 4/2011 | ........... | A61K 8/89 |

OTHER PUBLICATIONS

English Abstract of JP4667851, GE Toshiba Silicones, Apr. 13, 2011, 2 pp.
Monticelo, Robert A. "The Use of Reactive Silane Chemistries to Provide Durable, Non-Leaching Antimicrobial Surfaces", AEGIS Environments, Midland, Michigan, USA, www.aegismicrobeshield. com, Biocides in Synthetic Materials, 2nd International Conference, Sep. 28-29, 2010, Berlin, Germany, 77 pp.
Wikipedia, Definition of Antistatic Agent, pp. 1-2, 2008.

* cited by examiner

| Name of test bacteria (Strain Number) | *Escherichia coli* (ATCC 25922) | |
|---|---|---|
| Concentration of inoculum (cells/ml) | 1.87E+05 | |
| Measuring method of number of living bacteria | Pour plate method | |
| Type of Sample Material | Lululemon- 92% Nylon/8% Lycra Elastane<br>Under Armour -- 100% Polyester<br>Goldtoe -- 100% Cotton | |
| | *E. coli* | |
| Samples washed with Hex Performance + Detergent | Percent Reduction from Corresponding Laundered Control (Standard Reference Detergent) | |
| | 1 hr. | 24 hr. |
| Pink Lululemon shirt -- 5 wash | <20% | 88.9% |
| White Under Armour shirt -- 5 wash | <20% | >99.9% |
| White Goldtoe shirt -- 5 wash | <20% | 99.4% |

FIG. 5

| Soil | Substrate | Hex 57 mL | Tide Sport 57 mL | Tide Free & Gentle 46 mL | Hex 30 mL | Nathan 30 mL | Sig. Dif. |
|---|---|---|---|---|---|---|---|
| Dust Sebum | CPDP | 75.6 | 68.2 | 66 | 64.8 | 64.3 | 2.2 |
| Clay | CPDP | 68.2 | 67.4 | 66.1 | 69.6 | 65.0 | 3.0 |
| Grass | CPDP | 59.8 | 62.1 | 50.8 | 35.9 | 34.6 | 5.2 |
| Beef Blood | CPDP | 98.0 | 98.2 | 97.0 | 97.6 | 98.2 | 1.4 |
| Overall Soil Removal Total | | 301.6 | 295.9 | 279.9 | 267.9 | 262.1 | |
| % of Best | | Best | 98.1% | 92.8% | 88.8% | 86.9% | |

FIG. 7A

| Soils on CPDP | Tide Sport 57 mL | Hex Savinase 30 g | Nathan 30 mL | Sig. Dif. |
|---|---|---|---|---|
| Blood | 97.2 | 98.2 | 96.9 | 2.9 |
| Grass | 63.9 | 46.8 | 30.0 | 5.1 |
| Clay | 68.1 | 66.2 | 65.8 | 3.2 |
| Dust Sebum | 68.8 | 67.7 | 67.6 | 4.0 |
| Overall Soil Removal Total | 298.0 | 278.9 | 260.3 | |
| | Best | 94% | 87% | |

FIG. 7B

PERFORMANCE GEAR, TEXTILE TECHNOLOGY, AND CLEANING AND PROTECTING SYSTEMS AND METHODS

REFERENCE TO PENDING PRIOR PATENT APPLICATION

This patent application is a continuation-in-part of pending prior U.S. patent application Ser. No. 15/199,112, filed Jun. 30, 2016 by Drew Westervelt for PERFORMANCE GEAR, TEXTILE TECHNOLOGY, AND CLEANING AND PROTECTING SYSTEMS AND METHODS, which is a continuation-in-part of pending prior U.S. patent application Ser. No. 14/743,758, filed Jun. 18, 2015 by Drew Westervelt and Doug Bradford for PERFORMANCE GEAR, TEXTILE TECHNOLOGY, AND CLEANING AND PROTECTING SYSTEMS AND METHODS, which in turn claims the benefit under 35 U.S.C. 119 (e) of U.S. Provisional Patent Application No. 62/013,673, filed Jun. 18, 2014 by Drew Westervelt and Doug Bradford for "PERFORMANCE GEAR, TEXTILE TECHNOLOGY, AND CLEANING AND PROTECTING SYSTEMS AND METHODS.

The above-identified patent applications are hereby incorporated herein by reference.

BACKGROUND

Generally, it is a commonly know fact that soapy residues left in any textile will cause rapid re-soiling. Popular modern synthetic and synthetic blend high performance textiles/other materials used to manufacture apparel, gear and footwear present a special set of cleaning needs. These textiles/other materials are manufactured using more synthetic materials rather than cotton.

The re-soiling or entrapment of soapy residues, body oil, soil, bacteria and sweat also known as biofilms can lead to unwanted odors being trapped in any textiles/other materials. Research indicates both natural and synthetic fabrics are not responding as well to traditional detergents in regards to biofilm and causing hard to remove odor issues associated with bacteria, mildew and mold. Furthermore, performance gear manufacturers generally recommend against the use of bleach, fabric softeners and dryer sheets. Many end users, though, use popular detergents, fabric softeners, and dryer sheets that may clog tiny moisture wicking perforations in textiles/other materials furthermore this issue is exacerbated with overdosing as some end users believe more is better.

Synthetic fibers like polyester, nylon, rayon, spandex and olefin tend to have a natural affinity to oily and sticky residues. This is due to their chemical makeup, e.g., fiber polarity & surfactant polarity. Once soil and/or oil (sweat) is/are absorbed into and/or adsorbed onto one of these fibers or into a tight, perforated (breathable/moisture wicking) weave, special cleaning and preservative agents are needed to clean away these pollutants.

Most, if not all, currently available solutions fall short offering only short term desensitizing deodorization and/or odor masking/odor neutralizing properties in their spray, laundry additive or laundry detergent applications.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, a cleaning system for natural and synthetic high performance textiles and textile blends, sports gear, laundry and the like, may include a protective agent configured to create a bonded barrier of protection against odors caused by bacteria, mold, mildew and/or the like on the high performance textiles, sports gear, laundry, etc. The protective agent may include (an) antistatic agent(s), anti-soiling, color retention, softness enhancing properties, and (an) organosilane antimicrobial(s). The resultant bonded barrier may incorporate the organosilane antimicrobial(s). Such embodiments may also include a cleaning surfactant agent, configured to remove unwanted matter from general household and commercial laundry as well as high performance textiles, sports gear, laundry, etc. This detergent agent may include small amounts of organosilane that is introduced into the laundry wash cycle. The cleaning agent may include a variety of eco friendly (a) chelator(s), a plurality of nonionic/cationic surfactants, (an) organosilane antimicrobial(s) and a plurality of enzymes and formulated stabilizers.

Depending on dose formulation certain embodiment organosilane antimicrobial protective agents may comprises, by weight, generally up to 5 percent of the detergent formula. Whereas, certain embodiment cleaning agents may comprise, by weight, generally one percent chelator, in a range of generally 20 to 75 percent nonionic/cationic surfactants, and generally 0.7-75 percent enzymes and solvent solution (water). Particular cleaning agents may comprise, by weight, generally one percent chelator, generally of 20 percent nonionic/cationic surfactants, generally 0.7 percent organosilane antimicrobial, 75 percent solvent solution (water) and generally 0.7 percent enzymes. Other particular cleaning agents may comprise a concentrate, which comprises, by weight, generally one percent chelator, generally 71 percent nonionic/cationic surfactants, generally 10 percent solvent solution (water) generally 0.7 percent organosilane antimicrobial, and generally 0.7 percent enzymes.

System embodiments may further include a stain remover configured to facilitate removal of the unwanted matter from the high performance textiles, sports gear, laundry, etc. This stain remover may include (a) chelator(s), a plurality of nonionic/cationic surfactants, a plurality of enzymes, and (a) surfactant and solvent solution(s). Particular embodiment stain removers may comprise, by weight, generally one percent chelator, generally 71 percent nonionic/cationic surfactants, generally 0.7 percent enzymes, and generally a 0.75 percent surfactant and solvent solution.

In various embodiments, the cleaning agent may be provided in a first step of as a cleaning detergent to remove unwanted soil, oil, pollutants, and the like, and the protective agent may follow in a second step of a cleaning process to provide or add to a bonded, protective coating against odor-causing microbes. These cleaning agent and/or the protective agent may be applied as a hand wash. Additionally or alternatively, the cleaning agent and the protective agent may be used in a wash cycle and/or a rinse cycle of a water-based washing machine. In particular, the cleaning agent and/or the protective agent may be applied in a water-based washing machine having a detergent dispenser and a fabric softener/rinse dispenser, the cleaning agent being introduced via the detergent dispenser and the protective agent being introduced via the fabric softener dispenser. The washing machine may introduce the detergent to the wash cycle and to the rinse cycle, so that the detergent dispenser introduces the cleaning and protectant agent during the wash cycle and the fabric softener dispenser may introduce additional protective agent during the rinse cycle.

An alternative embodiment cleaning system for all natural & synthetic textiles and high performance textiles, sports gear, laundry, and the like may include a protective agent also configured to create a bonded barrier of protection against odors from bacteria, mold, mildew and/or the like on the high performance textiles, sports gear, laundry, etc. The protective agent may include (a) nonionic/cationic surfactant(s), (an) antistatic agent(s), and (an) organosilane antimicrobial(s). The bonded barrier is an organosilane antimicrobial(s). This alternative system may also include a cleaning agent configured to remove unwanted matter from the high performance textiles, sports gear, laundry, etc. The cleaning agent may include (a) enzymes, (a) chelator(s), a plurality of nonionic/cationic surfactants, water and possibly (a) biocide(s).

In particular alternative system embodiments, the protective agent may comprises, by weight, generally 0.1 percent of a nonionic/cationic surfactant, 0.1 percent a hydrginated castor oil, 0.05 to 0.01 percent organosilane antimicrobial, and 2 percent biocide, and the cleaning agent may comprise, by weight, generally 0.38 percent citric acid solution, generally two percent chelator, generally four percent nonionic/cationic surfactants, and generally 5.28 percent biocide.

The cleaning agent in this alternative system embodiment may be configured to be provided in a first step of a hand wash so as to remove unwanted soil, oil, pollutants and/or the like, and the protective agent is configured to be used in a hand wash rinse to provide a bonded, protective coating against odor-causing microbes.

A high performance textile and sports gear antimicrobial spray embodiment may in accordance with the present systems and methods comprise (a) nonionic/cationic surfactant(s) and (an) organosilane antimicrobial(s). The antimicrobial spray may be configured to create a bonded barrier of protection against odors from bacteria, mold, mildew and/or the like on the high performance textiles, sports gear, laundry, and the like. This bonded barrier includes the organosilane antimicrobial(s). In certain high performance textile and sports gear antimicrobial sprays the nonionic/cationic surfactant(s) generally make up 0.1 percent of the spray, by weight, and the organosilane antimicrobial(s) generally makes up 0.25 percent of the spray, by weight.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawing, in which:

FIG. 5 illustrates a series of test data for various fabrics, showing a percent reduction in the presence of *E. coli* relative to a standard reference detergent;

FIGS. 7A & 7B illustrate comparative soil removal data between Hex and one or more types of Tide detergent, according to an embodiment of the disclosure.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiment of the cleaning systems and methods of the present disclosure are specially designed for high performance textiles/other materials. These cleaning systems and methods are configured to breakdown and remove bio-loads on textiles that may otherwise provide breeding grounds for odors typically associated with bacteria, mold and mildew. Antistatic and anti-re-soiling properties may be built into such cleaning systems, both simplifying the cleaning process of today's apparel, gear and footwear and increasing the effectiveness thereof.

Figure 1:
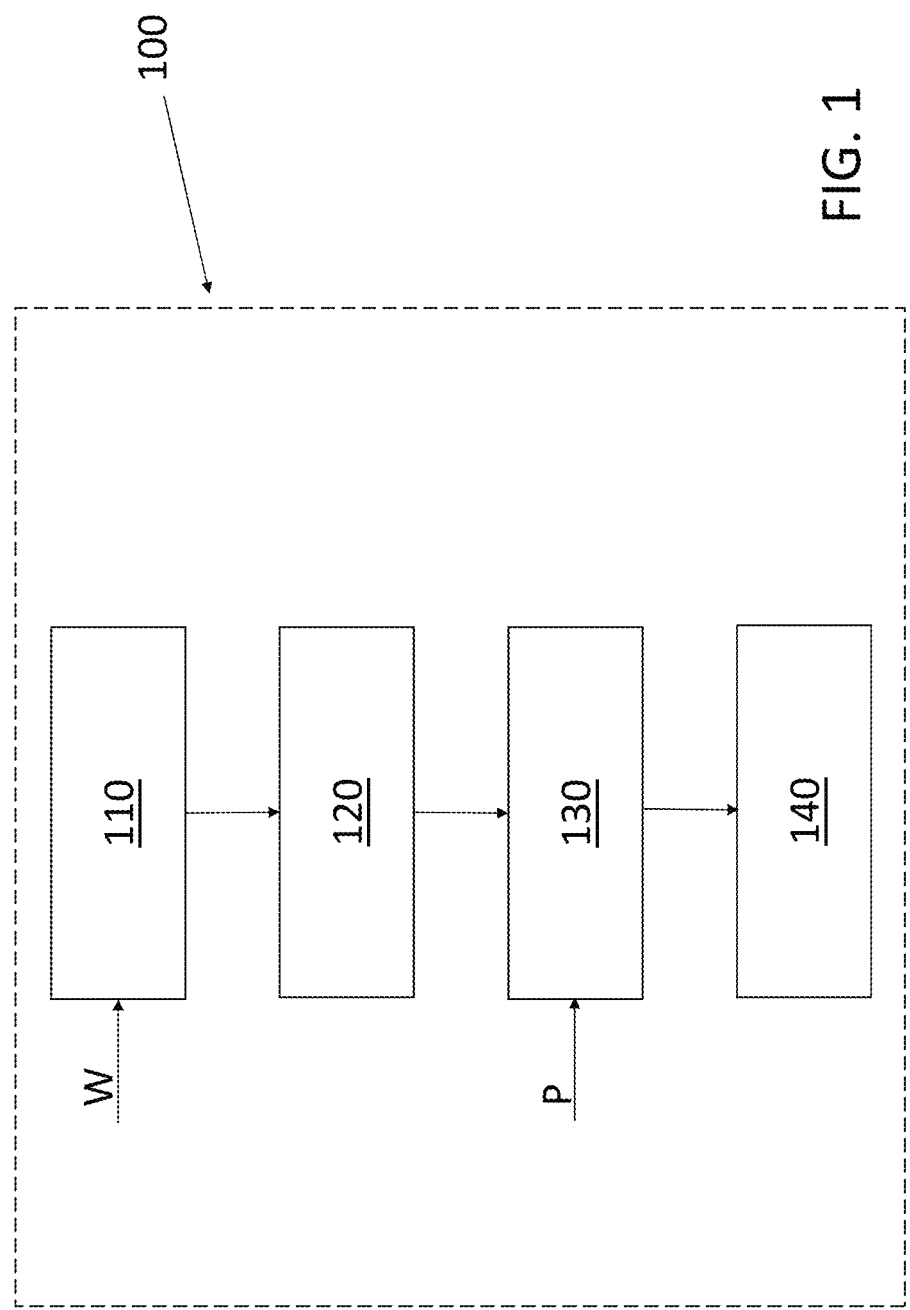
FIG. 1 illustrates an exemplary embodiment of a cleaning system involving a two-step process employed within a water-based washing machine, according to some embodiments.

Referring to FIG. 1, the cleaning system and the related method involve a two-step process that utilizes a water-based washing machine 100. The water-based washing machine 100 may be in the form of a top-loading machine or a side-loading machine, as are commonly available. Furthermore, the water-based washing machine 100 may be a commercial or home-use version. A given washing machine 100 typically employs, in order, at least a washing cycle 110, a first spin cycle 120, a rinse cycle 130, and a second spin cycle 140, but it is to be understood that additional versions of such cycles may be employed, whether provided by the control system (not shown) of the washing machine 100 or manually incorporated by the user by resetting the controls as desired. Further, for the purposes of the present cleaning system, the key aspect is that the water-based washing machine 100 offers a given washing cycle 110 and a given rinse cycle 130, as those serve as points at which to introduce, respectively, the washing agent W and the protective (booster or enhancing) agent P.

The present cleaning system and method, in various embodiments, first utilizes a premium washing or cleaning agent W, which is introduced during the washing cycle 110. It is to be understood that the washing agent W may be added directly into the washing machine or, if available, via a specific washing-agent (e.g., laundry detergent) dispenser (not shown), as might be provided by the given washing machine 100. It is to be understood, as well, that introduction during the wash cycle 110 would incorporate dispensing of the washing agent W within the water-fill portion of the wash cycle 110 or at some time during the actual washing process. The washing agent W is employed in lieu of a usual laundry detergent, as the washing agent W is used to remove unwanted matter from the clothing and/or gear being cleaned. The washing agent W particularly aids in the removal of unwanted soil, oil, and/or pollutants in preparation for the second step of present process, which is described next.

In accordance with such embodiments, the cleaning system and method next provides a protective agent P that yields a bonded long-lasting barrier of protection against odors typically associated with bacteria, mold and/or mildew. This protective agent P is introduced during the rinse cycle 130. The protective agent P, in a manner similar to the washing agent W, may be added directly into the washing machine 100 (if available—option typically not available for front-loading washers with an auto-lock feature) or, if available, via a fabric-softener dispenser (not shown), as might be provided by the given washing machine 100. Given that such a fabric-softener dispenser is configured so as to ensure deployment of the given dispensed liquid during the rinse cycle 130, the fabric-softener dispenser, like it does for dispensing of fabric softener liquid, also provides a ready-made avenue for timely dispensing of the protective agent P. This avenue is provided without the user needing to add an additional step midway in the overall washing process of manually poring protective agent P into the washer (a step that might be otherwise easy to forget and/or, at least mistime). Regardless, it is to be understood, as well, that introduction during the rinse cycle 130 would incorporate dispensing of the protective agent P within the water-fill portion of the rinse cycle 130 or at some time during the actual rinsing process. The protective agent P applies a bonded, long-lasting protective coating that resists the adsorption/absorption of staining and odor-causing microbes, such as bacteria, mildew, and/or mold. The second component, in at least some embodiments, additionally can provide antistatic and/or fabric softening properties. The protective agent P may also further incorporate a fragrance, particularly if being used in a variant to be used in washing clothing and/or towels.

The washing agent W may be a detergent/cleaning formulation which, for example, may include non-ionic/cationic surfactants, preservatives, chelating agents (which may serve to soften water and/or sequester metal ions), builders (which may act as a softener, buffering agent, and/or emulsifier), and/or organosilane, among other potential ingredients. It is noted that some additives can fill two such roles, such as citric acid which can act as both a preservative and a chelator, and it is to be understood that such dual-purpose ingredients, where available, are within the scope of the various formulations for either the washing agent W or the protective agent P. Such a first component is able to loosen and aid the removal of a bulk of the pollutants from the fabric, prior to the introduction of the second component in a second stage of the process. Thus, by using a first component of the present system, in the form of the washing agent W, the second component protective agent P is able to be that much more effective when applied in the second stage of the laundering system.

The protective agent P may include a quaternary ammonium antimicrobial (e.g., in the form of a silane and/or a surfactant blend) and may further include other components such as fragrances or enzymes. The quaternary ammonium silane acts as an odor-prevention component, bonding with the fabric and acting to block the adhesion, absorption, and/or adsorption of odor-inducing staining microbes, such as bacteria, mold, and mildew, on the fibers of the fabric (i.e., thus protecting against build-up of such undesired microbes). It is to be understood, however, that any reactive silane chemistry that is able to interact with the fibers of the fabric to yield a durable, non-leaching, microbe-resisting or otherwise antimicrobial surface could be employed and be within the scope of the present system. The protective agent P may further include at least one cationic surfactant, the cationic surfactant being able to aid in the bonding of the quaternary silane to the fabric.

In at least one embodiment, the washing agent W may also further incorporate at least one anti-microbial, similar to the kinds employed with respect to the protective agent P. By introducing anti-microbial components via both the washing agent W and the protective agent P, it effectively serves to give the gear and/or laundry being treated greater exposure to the antimicrobials throughout the full treatment process. Thus, the antimicrobials have a greater chance of bonding with the gear/fabric during a given treatment process than might otherwise be possible if only introduced through the protective agent P. Providing for longer use life and enhanced performance of treated surfaces. Alternatively or additionally, the antimicrobial in the washing agent W may serve as a preservative, in that it may inhibit the growth of microbes that might otherwise decrease the shelf-life of the washing agent W. That said, it is to be understood that, in some embodiments, the antimicrobial ingredient(s) might be introduced only via the protective agent P, with one example of that scenario being via the application of a renewal spray form of the protective agent P. Such a renewal spray may, for example, be used when there is not time and/or available equipment (e.g., washing machine, sink, etc.) to complete a full clean and protect process.

The antimicrobial may, in one variation, be in the form of an organosilane/bioprotect, such as one sold commercially as Ztrex 72 Antimicrobial (a 72% concentration of the organosilane). Such a solution is typically a thick suspension of the organosilane in medium to heavy concentrations in methanol or ethanol, as set forth in U.S. Pat. No. 8,968,771, the contents of which are hereby incorporated by reference thereto. Such an organosilane is miscible or stable in water up to 5% (saturation point), but in commercial production, the workable percentage is likely more in the 1.5% to 3% range (percentages by weight). In a detergent formulary, though it has been found to be challenging to have concentrations of 1% or more without becoming cost prohibitive, based on the material cost and the complexity of the processing needed to introduce such amounts of organosilane into the detergent.

Accordingly, in a broadest variation, the organosilane is present in a positive amount (i.e., a measurable amount greater than zero) of 5% or less. In another variation, the organosilane is present in a positive amount of 3% or less. In yet another variation, the organosilane is present in a positive amount of 1.5% or less. In an even yet further variation, the organosilane is present in a positive amount of 1% or less. In a preferred variant, the organosilane is present in a 0.07% concentration. The limits on such percentages tend to be tied with the process constraints on making an effective formulary, and those process constraints will be discussed later in the application. In some embodiments, the antimicrobial (e.g., organosilane/bioprotect) may be present in an amount of at least 0.05% and may further be present in a range of 0.05%-1%. In some embodiments, the antimicrobial may particularly be present in a concentration of 0.07%, 0.25%, or 0.7%.

The washing agent W and/or the protective agent P may further include one or more various enzymes. Such enzymes may serve to break down biofilms, mold, and/or mildew that might already be present in the fabric, thereby helping to eliminate unwanted odors at the source thereof and/or to help achieve a more effective cleaning. These enzymes can also aid in the removal of surfactant residues and biofilms, such as those left behind by ordinary detergents, and various pollutants and protein based stains (e.g., particulate soil, grass stains, oily stains, etc.). Certain enzymes may also act as a softening agent and/or help to reduce the chances of residue from sticking to the fabric (e.g., due to the presence of otherwise residual starches in the fabric). The types of enzymes may, for example, include, amylase, pectin, lipase, mannanase and/or protease.

This cleaning system can be either applied by a hand wash (in a sink in two stages or in a pair of separate containers) or can be used in a washing machine, utilizing both the detergent dispenser and fabric softener dispenser as needed or by manually adding the first part during the wash cycle and the second in the rinse cycle, as discussed above. More broadly, the two-part system is meant to be applied in two separate stages, and any cleaning process that provides for the use of the two components in such a manner would be within the scope of this laundering system/process. In various embodiments, the present cleaning systems and methods include a cleaner (e.g., washing agent W) and a protector (e.g., protective agent P). The cleaner removes unwanted matter from fabrics made up of, for example, synthetic/synthetic, synthetic/cotton blend fibers, and 100% cotton. The protector provides bonded long lasting protection against odor typically associated with bacteria, mold and mildew in addition to provided antistatic and fabric softening capabilities. In an embodiment, the cleaner and protector may be use used in conjunction with one another or in the case of hand washing gear, directly after one another. When using the gear wash (i.e., detergent/cleaner and protector) in a conventional washing machine, the application steps may be combined by the machine's dispensing system or the application steps may be separated by application of the cleaner in the wash cycle and application of the protector in the rinse cycle.

In accordance with embodiments of the present systems and methods, prior to application of the second-stage odor protection, the cleaning process may be left out if the product being treated is new and unsoiled. The present systems and methods can be used on any hard or soft surface to clean and place a protective, bonded barrier against odor typically associated with bacteria and its byproducts.

When using the present cleaning systems and methods, a user experiences very low odor emission between uses of the cleaning systems and methods. The textiles tend to dry quicker. A user experiences an increase in the useful life of gear and apparel through proper cleaning. A user experiences better wicking properties of performance apparel. A user experiences less need for fabric softeners or dryer sheets.

In the past, apparel has been cleaned with typical laundry detergents while gear cleansing and odor protection has been not addressed at all, except for topical spraying with a deodorizer or disinfectant, washed with normal laundry detergents, or masked with a fragrance. To date, a cleaning process has not been developed that combines together two distinct separate cleaning and protecting methods for performance gear, footwear and apparel. The present cleaning systems and methods involve a two-step process that utilizes a premium cleaning agent followed by the application of a long lasting bonded barrier of protection against odors typically associated with bacteria, mold and mildew that additionally provides antistatic and fabric softening properties. The first step removes the unwanted soil, oil and pollutants in preparation for the second step application of a bonded, long lasting protective coating against creation of odor.

In the past the wearer of performance gear, footwear and apparel either utilized topical sprays or general cleaning detergents, which leave no protective coating behind. The reasons these products are ineffective is two-fold. First, these products often utilize fragrances to mask odor. Secondly, these products do not always effectively remove odor-causing biofilms that both adsorb and absorb into the synthetic/synthetic blend fibers commonly used to manufacture today's premium performance wear.

None of the prior cleaning agents contain ingredients that leave behind an odor protection coating to provide long lasting protection from odors typically associated with bacteria. Furthermore, OEM anti-microbial applications have been the focus to date, not aftercare reapplication. For example, silver chloride is used as an antimicrobial agent in some infection resistant surgical fabric materials. Likewise some clothing has incorporated silver ions, i.e. ionic silver on the clothing textile. However, chloride, secreted through sweat glands on the body as sodium chloride, may form silver chloride creating a compound that minimizes silver ions antimicrobial characteristics in such clothing. Further, some such silver ions incorporated into fabrics have some negative effects on enzymatic properties of cleaning agents. They also may combine with other elements secreted by the body forming compounds that may have antimicrobial properties but can cause eventual heavy metal resistance in microbes. Also silver may inactivate enzymes, which may affect the way cleaning agents perform. In contrast, organosilanes, such as used and deposited as a barrier on fabrics in accordance with embodiments of the present systems and methods do not promote resistance because they kill mechanically. Further, organosilanes break down and neutralize into natural organic compounds, leaving behind no harmful residue or metals.

The present systems and methods are the first to apply this technology as an aftercare solution in the form of a laundry detergent, gear wash, and/or topical spray. The present products and cleaning procedures are designed to meet or exceed the growing need for proper cleaning and verifiable protection of hard and soft surfaces from microbial growth.

When possible, the cleaner and protectant of the present disclosure may be used prior to a first use of the performance apparel. The cleaner and protectant may be used regularly in place of a current detergent (e.g., deposited in the washing machine directly or into a detergent dispenser). A second-stage protectant may be added to the user's washing machine's fabric softener dispenser. Either a warm or cold water setting may be used for the washing machine cycle. An advantage of this system is that it tends to be effective at warm or cold water settings, meaning that hot water need not necessarily be used in order to adequately clean the gear and/or other related laundry.

The cleaner and protectant works effectively with all fabrics, not just performance apparel. Athletes and fitness enthusiasts may, for example, may employ it with work-out clothing, towels, and/or undergarments to keep odors from developing.

As noted, in various embodiments, the present cleaning systems and methods may be used with a machine wash. This may include following the manufacturer's recommended cleaning instructions on the gear label. In a particular example embodiment, the user may pour, by way of example, three ounces of the cleaner component in the washing machine's detergent receptacle. Next, the user may pour, by way of example, three ounces of the protector component in the washing machine's fabric softener receptacle. These steps may be followed by washing on a medium or normal setting with warm or cold water. This may be followed by air-drying or drying in a dryer (not shown) on a low-heat setting. While one to three ounces amounts might be the nominally recommended amounts for any of the various embodiments, it is to be understood that other amounts could be added based on, by way of example only, such factors as the level of cleaning/protection desired, the amount of gear/clothing being treated/wash-load size, manufacturer's guidelines, whether one or both of the components are concentrated, etc.

Another exemplary embodiment, by hand washing items, may include using a cleaning agent (such as a cleaner, an organosilane protector, and/or the like, discussed below) involving a step of pouring, by way of example, three ounces of the cleaning agent in a bucket with, by way of example, five gallons of water (or another amount of water sufficient to facilitate hand-washing). There may also be a step to wash off excess soil prior to using the cleaning agent. Additionally, testing for color-fastness prior to first use is recommended. A next step involves thoroughly soaking the entire item and scrubbing as needed for at least two minutes. Another step involves squeezing out excess solution. A next step is to treat the item with a protective agent. It is to be understood that, in instances where the odors within the gear, towels, clothing, etc., are particularly well-developed, it may take multiple washings for odors to be completely removed from the item.

In another exemplary embodiment, application of only a gear shield protectant, such as to new clothing or other items, may involve a step of pouring, by way of example, three ounces of the organosilane protector in a bucket with, by way of example, five gallons of water (or another amount of water sufficient to facilitate hand-washing). Thereafter a step may call for thoroughly soaking the entire item for at least two minutes. A step may then be provided to squeeze out excess solution. This treatment method may also include air-drying or drying in a dryer (not shown) on a low heat setting.

In one example (as sold under the trade name of Hex Advanced laundry detergent and Hex Advanced Laundry Detergent, or the like), the cleaning agent W may include the following general ingredients: water; at least one builder/chelator/preservative; one or more non-ionic surfactants; an organosilane antimicrobial (antimicrobial organofunctional silane); one or more enzymes; and a thickener for surfactant-based systems. In accordance with one particular embodiment or implementation, such a liquid laundry detergent, which may be used as a wash agent W in accordance with the present systems and methods may generally include, by weight: 76 percent water; 0.1 percent preservative; one percent chelator; five percent nonionic/cationic surfactant; 9.6 percent nonionic/cationic surfactant; 5.6 percent non-ionic/cationic surfactant; 0.07 percent an organosilane antimicrobial; one percent propylene glycol; 0.35 percent liquid protease enzyme preparation; 0.35 percent an amylase; and, 0.75 percent thickener. Per this and other examples, it is submitted that any various known preservatives, chelators, surfactants, organosilanes, enzymes, thickeners, etc., used in laundry detergents may be used per the general formulary provided and still be within the scope of the present disclosure.

In a second particular example embodiment or implementation (as sold under the trade name of Hex Performance Advanced single dose laundry detergent or the like), a laundry detergent concentrate gel, which may be used as a wash agent W in accordance with the present systems and methods may generally comprise, by weight: 0.1 percent preservative; 55.93 percent nonionic/cationic surfactant; 9.6 percent nonionic/cationic surfactant; 5.6 percent nonionic/cationic surfactant; ten percent propylene glycol; 7.5 percent glycerin; 9.5 percent water; 0.35 percent liquid protease enzyme preparation; 0.35 percent amylase; one percent chelator; and, 0.07 percent organosilane antimicrobial.

In another example (as sold under the trade name of HEX Ultra+Dual Action Gear Wash, or the like), the cleaning fluid may generally include water; one or more chelating/water softening/preserving agents; one or more non-ionic surfactants; and an antimicrobial quaternary ammonium surfactant blend.

An example stain remover (which may be sold under the trade name HEX Performance Power Stain Remover, or the like) may, in accordance with embodiments of the present systems and methods, include a preservative, one or more nonionic/cationic surfactants, filler/bulkers, one or more enzymes, a chelator and/or a solvent. In accordance with one particular embodiment or implementation, such a stain remover may generally comprise, by weight: 0.1 percent preservative; 55.93 percent nonionic/cationic surfactant; 9.6 percent nonionic/cationic surfactant; 5.6 percent nonionic/cationic surfactant; 8.82 percent propylene glycol; five percent glycerin; 12.5 percent water; 0.35 percent liquid protease enzyme preparation; 0.35 percent amylase; one percent chelator; and 0.45 percent of a surfactant/solvent.

In yet another example (as sold under the trade name of HEX On Demand+ Spray & Go, HEX Performance Ultra On Demand Spray, and/or the like), a spray applied cleaning fluid may contain water; at least one non-ionic surfactant; and a plurality of ammonium-based antimicrobials. In accordance with one particular embodiment or implementation, such an on-demand spray that may be used as a topical treatment on clothing, gear or the like, such as when washing is impractical may generally comprise, by weight: 99.55 percent water; 0.1 percent nonionic/cationic surfactant; 0.1 percent preservative; and 0.25 percent organosilane antimicrobial.

In another example, (sold under the trade name HEX Clean+ Gear Renew, HEX Performance Ultra Gear Renew, and/or the like), a fabric treatment and protectant solution (which may be particularly well adapted for hand washing and treatment) includes water, a non-ionic surfactant, a fabric softener and antistatic agent, and a plurality of ammonium-based antimicrobials. In accordance with one such embodiment or implementation, a gear renewal that may be used for fabric (hand) washing and treatment may generally comprise, by weight: 88.34 percent water; 0.38 percent citric acid solution; two percent chelating agent; one percent nonionic/cationic surfactant; three percent nonionic/cationic surfactant; and 5.28 percent quaternary ammonium surfactant biocide.

In various examples, for apparel, one or more of the above detergents or the like is used for cleaning, and a protectant (sold under the trade name HEX Enhance+, HEX Performance Booster, and/or the like) may, for example, be dispensed through the fabric softener receptacle. One or both of these will have similar components as compared to other detergent and protectant variants, and one or both may further include a fragrance, given that this combination is formulated with the idea of treating, for example, laundry and towels where fragrance may typically desired. Even though fragrance might be included, it is to be understood that the fragrance still is not included simply to mask the presence of odor-generating microbes, as these variants, like the others, provide ingredients that are effective at attacking those at their source and that make it difficult for microbes to live and grow between washes/treatments. Embodiments of such a protectant may include water, a scent additive, an antistatic and organosilane antimicrobial. A particular embodiment or implementation, such a laundry additive performance booster, which may be used as protective agent P, may generally comprise, by weight: 88.37 percent water; 1.5 percent scent additive, such as a fresh scent, sport scent, etc.; 10 percent of an antistatic solution; and 0.13 percent organosilane antimicrobial.

Embodiments of a protectant (sold under the brand name HEX Performance Ultra Gear Shield, or the like) which may be particularly well suited for application via hand washing, alone (such as with new garments) and/or in conjunction with one of the above detergents or the like (particularly, HEX Performance Ultra Gear Renew, or the like) may include water, a nonionic/cationic surfactant, an antistatic, an organosilane antimicrobial and a quaternary ammonium surfactant biocide. In accordance with a particular embodiment or implementation, such a gear may generally comprise, by weight: 97.55 percent water; 0.1 percent nonionic/cationic surfactant; 0.12 percent antistatic; 0.025 percent organosilane antimicrobial; and 2 percent quaternary ammonium surfactant biocide.

In another application organosilane can be added to a textile target using a sponge medium carrying the organosilane and transferred when both are undergoing a drying cycle in a clothes dryer. This process disperses the organosilane to the textile target while drying. When fully dried the organosilane is permanently bonded to the textile carrier.

In another application, indoor and outdoor surfaces for activities, which may include sport surfaces such as, but not limited to, hard and soft such as tents, seating, umbrellas, awnings, outdoor awnings, boat covers and seating, automobile/transportation upholstery, baseball gloves, and bats, can be cleaned and protected using the same system. If cleaning is not necessary, the protector can be applied to protect from odor typically associated with bacteria mold and mildew.

In relation to the above-listed examples, HEX PERFORMANCE liquid detergent, HEX PERFORMANCE concentrate single dose laundry detergent, HEX PERFORMANCE two-part gear wash, HEX PERFORMANCE topical spray, HEX PERFORMANCE stain stick, HEX PERFORMANCE dryer application, or the like could particularly be used as, or in conjunction with, the washing agent W in the process outlined above utilizing a given washing machine 100. Likewise, HEX Enhance+, HEX Performance Boost, HEX Performance Ultra Gear Shield, and/or such second-phase treatment agent could be used as the protective agent P in the process outlined above utilizing a given washing machine 100.

When cleaning gear by hand during the cleanse stage (e.g., employing HEX PERFORMANCE liquid detergent, HEX PERFORMANCE concentrate single dose laundry detergent, HEX PERFORMANCE two-part gear wash, HEX PERFORMANCE topical spray, HEX PERFORMANCE stain stick, HEX PERFORMANCE dryer application, and/or the like), it should be appreciated that agitation may be a key to successful cleansing so as to best remove any dirt and/or pollutants that might otherwise be strongly adhering to the lattice of the fabric. It is recommended to use a washing machine, when time and facilities permit, because the washing machine is already configured to provide such agitation.

The recitation of percentages herein, such as provided above in describing the formulations of washing agents, protective agents and the like are intended to be illustrative and general in nature, indicative of the formulations discussed and not limiting in their precision, nor exact.

A key benefit of the present system is that the wash or cleaning agent W and the protecting agent P can be employed within a single, standard water-based washing machine 100. Being able to use a single water-based washing machine 100 provides multiple advantages. First of all, it allows performance gear and/or other laundry that can be subject to development of odor-causing microbes to be processed without having to send it out to a special facility (e.g., dry cleaner) and/or without requiring two or more different machines to achieve the washing and protecting steps. Secondly, by being conducive to use in a water-based washing machine 100, the process can be easily carried out on a regular and/or as-needed basis, for example, at home or in a team facility.

A third benefit surrounds the dispensing capabilities of typical water-based washing machines 100, allowing the washing agent W and the protective agent P to be introduced at the beginning of the overall wash process (e.g., at the beginning of the wash cycle 110), thus further simplifying the treatment process. For example, for the washing agent W may be disposed into the main wash receptacle (not shown) of the washing machine 100 and/or, if available, into a laundry detergent receptacle. Likewise, the protective agent P, may be provided in the fabric softener receptacle (not shown) of the washing machine 100), at generally the same time that the washing agent W is provided, without the user having to come back to complete such a step later in the washing process. This simplification of the process is available due to the fact that the washing machine 100 is typically configured to deploy automatically the agent residing in the fabric softener dispenser at the beginning of the rinse cycle 130.

A yet additional advantage of this system is that, if desired, it is simple and safe enough to use in a hand-wash and hand-rinse set-up, again as a water-based system.

While variants of the washing agent W and the protective agent P specifically disclosed herein are in the form of liquid-based mixtures, solutions, and/or suspensions, it is to be understood that it may be possible to provide one or both such agents in powder form, and that such variants would be deemed to be within the scope of the present system.

In general, the washing agent W (also known herein as the detergent, cleaner, or cleaning agent) generally includes a blend of enzymes, surfactants, preservatives, and antimicrobial organosilanes which are used to clean the gear and/or laundry, while the protective agent P generally incorporates a blend of surfactants, preservatives, and antimicrobial organosilanes that protect the gear and/or laundry and that may provide antistatic, softening, and/or odor protecting attributes. As outlined above, the washing agent W and/or the protective agent P may include other ingredients and still fall within the scope of the present system.

Figure 2:
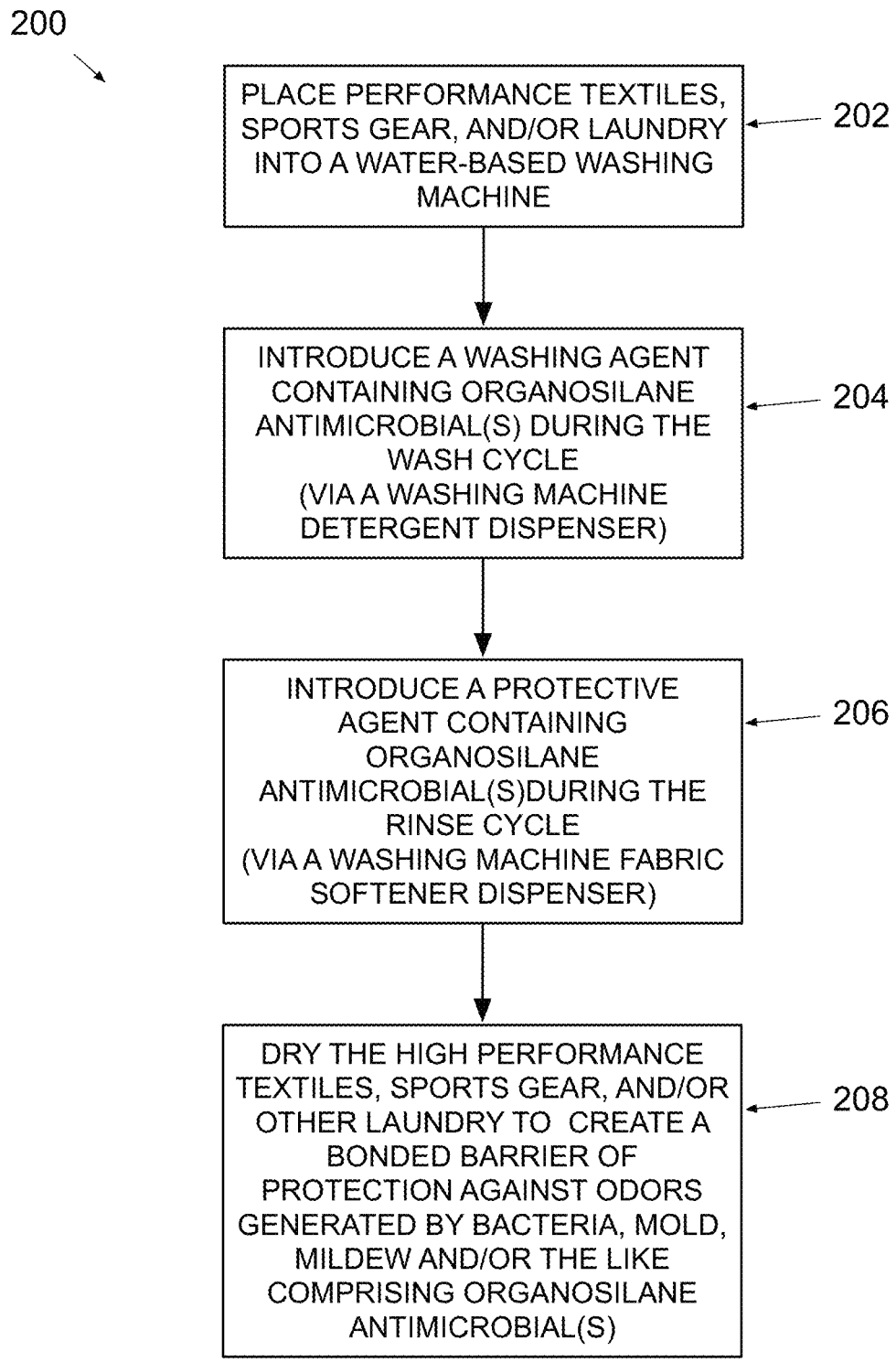
FIG. 2 illustrates an exemplary implementation of a method for cleaning, and applying a protective treatment to high performance textiles and/or other materials and gear incorporating high performance textiles, using a water-based washing machine, according to some embodiments.

FIG. 2 illustrates an exemplary implementation of method 200 for cleaning, and applying a protective treatment to high performance textiles and/or other materials and gear incorporating high performance textiles, using a water-based washing machine (100), according to some embodiments. Therein performance textiles, sports gear, and/or other laundry are placed into a water-based washing machine (100) at 202.

At 204 a washing agent, such as described above, is introduced during the wash cycle of the washing machine. As described above, this washing agent may be configured to remove unwanted matter from the high performance textiles, sports gear, and/or other laundry and may comprise (a) chelator(s), a plurality of nonionic/cationic surfactants, (an) organosilane antimicrobial(s) and a plurality of enzymes. As additionally described above, the washing machine (100) may include a detergent dispenser, and introducing the washing agent at 204 may be carried out by inserting the washing agent into the detergent dispenser for automatic dispensing during a wash cycle.

Method implementation 200 further includes introducing a protective agent during the rinse cycle, at 206. The protective agent may be configured to create a bonded barrier of protection against odors generated by bacteria, mold, mildew and the like on the textiles, sports gear, and/or other laundry. The protective agent may, as described above, comprise (an) antistatic agent(s) and (an) organosilane antimicrobial(s). As also further described above, the washing machine (100) may include a fabric softener dispenser, and introducing the protective agent at 206 may be carried out by inserting the protective agent into the fabric softener dispenser for automatic dispensing during a rinse cycle, following the wash cycle.

At 208, the high performance textiles, the sports gear, and/o other laundry, is dried (e.g. air dried, dried in a gas or electric dryer on a low setting, etc.) thereby creating the bonded barrier of protection against odors generated by bacteria, mold, and mildew, or the like. This resulting barrier comprises at least the organosilane antimicrobials (from the wash and/or protective agents) in accordance with the present systems and methods.

Figure 3:
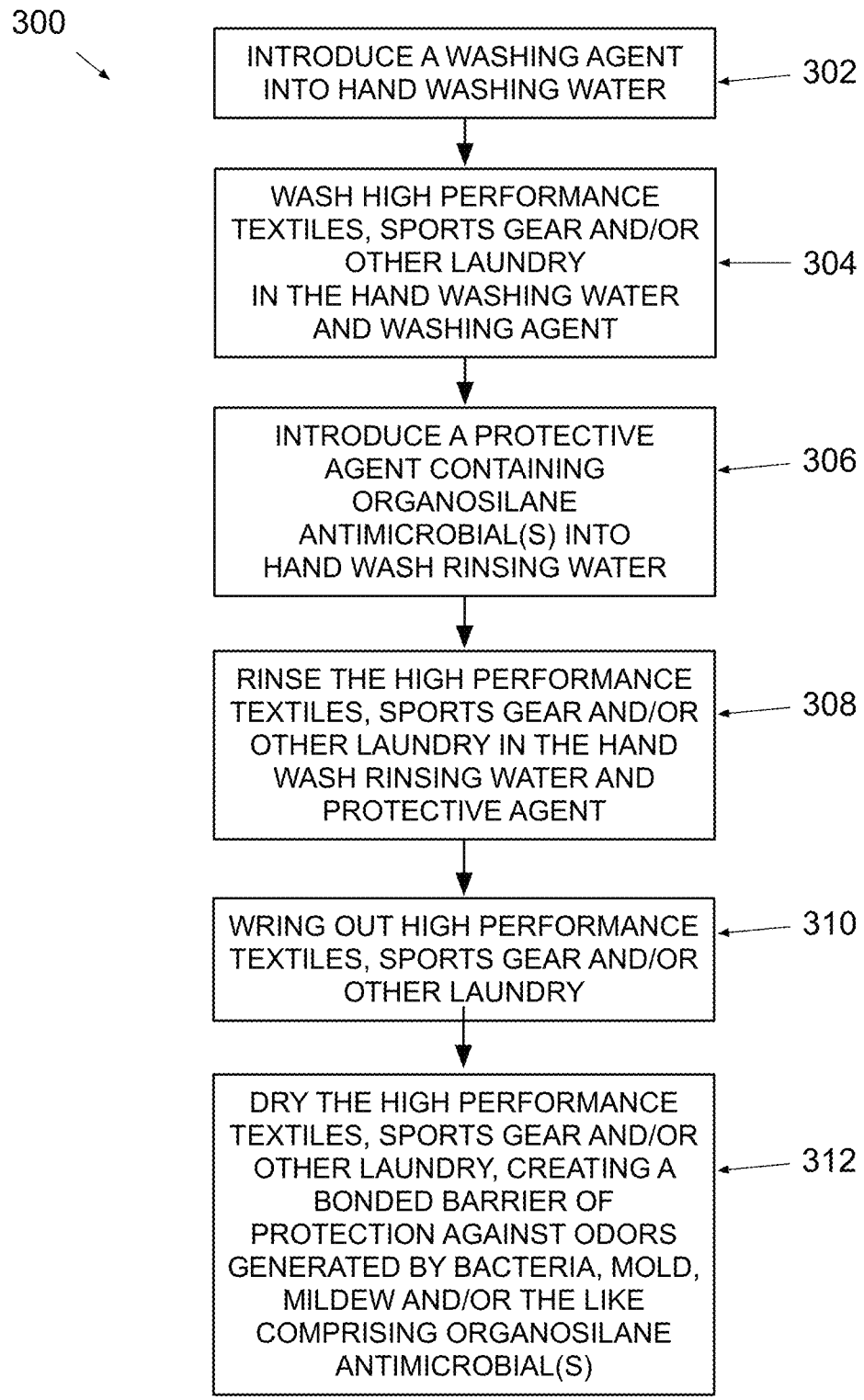
FIG. 3 illustrates an exemplary implementation of a method for cleaning, and applying a protective treatment to high performance textiles and/or other materials and gear incorporating high performance textiles, via hand washing, according to some embodiments.

FIG. 3 illustrates an exemplary implementation of method 300 for cleaning, and applying a protective treatment to high performance textiles and/or other materials and gear incorporating high performance textiles, via hand washing, according to some embodiments. Therein, a washing agent is introduced into hand washing water, at 302. This washing agent may be configured to remove unwanted matter from high performance textiles, the sports gear, and/or other laundry. The washing agent may, as described above include (a) citric acid solution(s), (a) chelator(s), a plurality of nonionic/cationic surfactants, and (an) biocide. At 304 the high performance textiles, sports gear, and/or other laundry, is washed in the hand washing water and washing agent.

At 306 a protective agent is introduced into (fresh) hand wash rinsing water. The protective agent is configured to create a bonded barrier of protection against odors generated by bacteria, mold, mildew, and the like. As described above, such a protective agent may comprise (a) nonionic/cationic surfactant(s), (a) antistatic agent(s), (a) biocide(s), and (an) organosilane antimicrobials. At 308 the high performance textiles, sports gear, and/or other laundry is rinsed in the hand wash rinsing water and protective agent to provide the bonded barrier of protection against odors generated by bacteria, mold, mildew and/or the like.

At 310 the high performance textiles, sports gear, and/or other laundry may be wrung out and at 312 dried (e.g. air dried or dried in a low temperature set electric or gas drier) creating the bonded barrier of protection against odors generated by bacteria, mold, mildew and/or the like. This barrier comprises at least the organosilane antimicrobial(s) (from the protective agent) in accordance with the present systems and methods.

Figure 4:
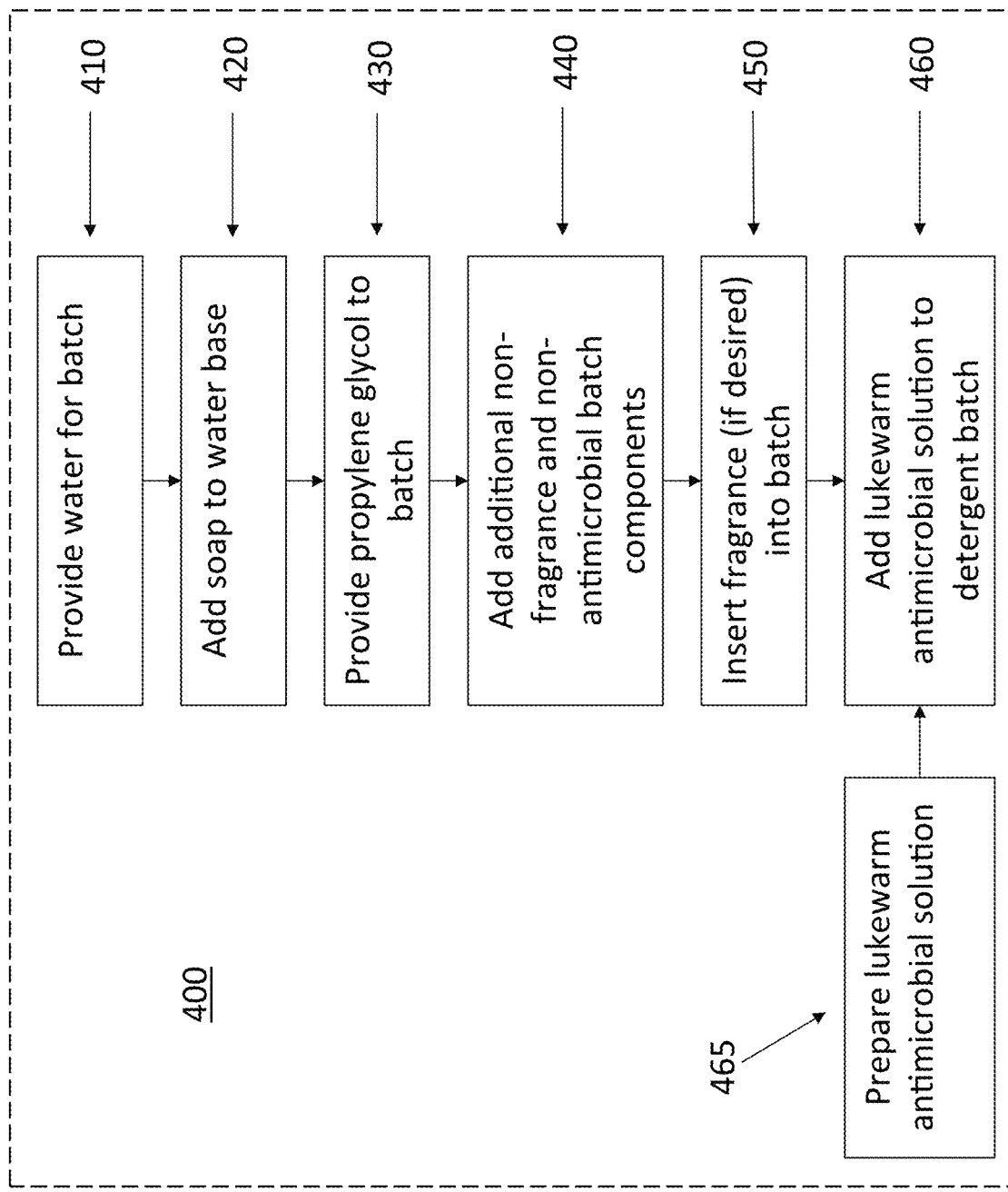
FIG. 4 illustrates an exemplary method of forming a batch of the liquid detergent, according to some embodiments.

FIG. 4 shows a flow chart providing the batching process 400 for a standard fresh liquid detergent according to some embodiments of the present disclosure. In some variants, the liquid detergent may be effectively equivalent to the washing agent W discussed above or, in other instances, may be a "stand-alone" laundry detergent. The batching process 400 may generally include a first water-supply step 410, a second soap-addition step 420, a third propylene-glycol provision step 430, a fourth ingredient-addition step 440, a fifth, potentially optional, fragrance-addition step 450, and a sixth antimicrobial-addition delivery step 460. All ingredients are measured by weight for each batch and, in one variation, such weighing is done with a variance limit of less than 1% by weight. Furthermore, to ensure the desired level of batch accuracy, the scales may be calibrated quarterly or sooner (e.g., monthly or bi-weekly), including any truck/large-level scales. The blend order provided per the batching process 400 avoids the need for intense agitation at extremely long periods of time. Thus, the blend order 410-460 is considered to be the most commercially viable. However, it is understood that the ingredients could be mixed in any order, if the producer is willing to use increased agitation and/or longer agitation times and/or willing to confront other challenges that might arise by choosing to process the ingredients in a manner other than that set forth here. It is to be understood that the terms adding, providing, inserting, and delivering and their general derivatives are considered to be substantially equivalent terms and thus interchangeable for the discussion of the batch process 400.

The first water-supply step 410 provides water as a base solvent for dissolving and/or suspending all the other ingredients. The first water-supply step 410 is followed the second soap-addition step 420. The second soap-addition step 420 provides the soaps (ingredients 2, 3, 4), "bleeding" (e.g., slowly and steadily introducing) the soap ingredients into the tank (not shown) used for the batching process 400. Slowly introducing the soaps or soap-forming components (e.g., chelators, surfactants) into the tank under slow to moderate agitation results in little or no foaming. (Little to no foaming is most desirable, as foaming may make fluid handling more difficult and/or can add to the overall processing time.) If the soaps were to be added before the water, it would likely result in a greater degree of gelling, bonding, and/or foaming of the soaps. Further, if such gelling/bonding were to occur, it would likely take additional/excessive agitation to break the gelling/bonding, yielding more foaming. Finally, as part of the soap-addition step 420, the soap ingredients can be added together as a mixture and/or in any order, as the order of addition of this group of soap ingredients within step 410 does not matter.

The third propylene-glycol addition/provision step 430 involves adding propylene glycol to the water-and-soap mixture created by the blending steps 410 and 420. The propylene glycol offers additional solvency and reduces viscosity. The propylene glycol particularly helps in dissolving and/or suspending the next set(s) of ingredients to be added as part of the batching process 400. The propylene glycol may be added, for example, in a range of 3-12% and, more particularly, about 8-10%.

Upon adding the propylene glycol per step 430, additional ingredients 6, 7, 8, 9, 10 may then be added. The ingredients 6-10 can be introduced as a mixture and/or in any order as part of step 440. Alternatively, it is to be understood that to be understood that, in certain embodiments, only some of these additional ingredients may be included and/or other additional ingredients not listed may further be included as part of step 440. The additional ingredients, however, do not include fragrance and/or organosilane/antimicrobial, as those components are to be added in subsequent steps, if they are to be included.

Next, if a fragrance is to be included, the fragrance-provision step 450 may advantageously be performed (i.e., after steps 410-440). The fragrance is not inherently water soluble, and the presence of all the other non-water batch ingredients/components help to homogenize and/or suspend the fragrance into the batch. Of course, for a free clear formula that is, among other things, fragrance-free, the fragrance-provision step 450 would be omitted.

Upon performing steps 410-440 (fragrance free) or steps 410-450 (fragrance included), the antimicrobial-provision step 460 may then be carried out. It is important to note that the organosilane/bioprotect material used as the antimicrobial material may be more effectively incorporated into the batch if that component or set of components is first dissolved and/or mixed into sufficiently warm water (in some embodiments, 90 F-100 F), in a precursor step 465 to step 460. In one embodiment, that mixture is made at a ratio of 2.96 gallons of organosilane/bioprotect to 10-20 gallons of water.

While the exact amount of organosilane/bioprotect to be dissolved/mixed with the warm water in the precursor step 465 may vary, it is more important for the water to be sufficiently warm enough. In particular, organosilane will generally not dissolve/mix easily in cold to lukewarm water (i.e., water at less than 80 F), meaning, at the very least, that greater agitation and/or longer stirring times may be needed to achieve sufficient mixing. If the water is too cold, however, there is a chance that sufficient dissolution may not be possible no matter the length or level of agitation involved. It is to be understood that the precursor step 465 here of dissolving the organosilane/bioprotect in the warm water may be performed after steps 440/450, or it may be performed concurrent with some or all of steps 410-450, as needed to make the process perform smoothly. In one variant, the full dissolution of the organosilane/bioprotect in the warm water may be performed "just in time" so as to be ready for provision to the batch immediately or nearly so upon the completion of step 440 (fragrance-free batching) or 450 (fragrance-included).

In the antimicrobial-delivery step 460, the warm organosilane/bioprotect solution may, in one embodiment, be bled/slowly fed into the blending tank (not shown) with all the other ingredients previously introduced in steps 410-440 (fragrance-free batch) or in steps 410-450 (fragrance-inclusive batch). As part of this step 460, the sum ingredients from all the various additive steps are blended under slow to moderate agitation, as needed to promote mixing while minimizing foaming and/or other issues. The parameters associated with the preparation and delivery of organosilane/bioprotect solution (i.e., via the antimicrobial delivery step 460 and/or the precursor organosilane/antimicrobial preparation step 465) are important to the overall batch process 400.

For example, if one were to add the organosilane directly to the batch without pre-dissolving it in warm water first, it would likely promote clumping of the organosilane and/or the creation of floating organosilanes particles on the top of the batch. To overcome such clumping or floating particles, additional and potentially excessive agitation would likely be needed to completely break up the clumps or particles. Such additional agitation, at a minimum, would increase the amount of energy and thus the cost needed to process a given batch and, possibly, cause foaming. Foaming is undesirable, for example, because it may make stirring/mixing and general batch handling more difficult, and it may increase the time for processing, for example, requiring additional time to allow the foam (i.e., suds) to settle sufficiently prior to filling containers for sale.

Yet further, the temperature at which the organosilane is dissolved/mixed into the water as part of initial/precursor step 465 associated with step 460 can be highly important, as well. For one, if the water temperature in that precursor step is too low (less than 80 Fahrenheit (80 F)), the organosilane tends to tense up and create clumpy bonded particles that are difficult to dissolve/break up. On the other range of the temperature spectrum, if that water temperature is too high (above 120 F), the organosilane may cause the organosilane/water mixture to become cloudy and/or hazy. When an attempt to introduce such a cloudy/hazy organosilane/water mixture into the batch as part of step 460, the organosilane has shown a tendency to separate to the top or to fall to the bottom of the batch container. Accordingly, based on such testing, it is believed that the warm water of the precursor step should be kept at a temperature in the range of 80 F-120 F or, more particularly, 90 F-100 F.

A couple of general notes are worth making regarding foam or suds control. It is to be understood that any or all of the steps 420-460 occurring after the step 410 of providing water may, in at least some embodiments, be performed under a level of agitation (e.g., mild to moderate) chosen so as to minimize any foam formation while still being sufficient to aid mixing and/or dissolution of the various batch components. Similarly, in at least some embodiments, the soap-forming components, the propylene glycol, the at least one additional ingredient, fragrance, and/or the lukewarm antimicrobial solution may be bled into the batch at a rate so as to minimize foam formation.

FIG. 5 illustrates a series of test data for various fabrics (including 92% nylon/8% Lycra elastane/spandex; 100% polyester; 100% cotton), showing a percentage reduction in the presence of *E. coli* relative to a standard reference detergent. In the test associated with the results shown in FIG. 5, the samples were washed using a modified AATCC 61-2A method to simulate five home launderings with "Hex Performance+" laundry detergent. Further, the test method followed ASTM E2149-13, which is the "Standard Test Method for Determining Antimicrobial Activity of Immobilized Antimicrobial Agents." Samples were dried flat at 95° F. for 30 min between wash cycles. These samples demonstrated significant bacterial reduction (more than 85% for all fabric types tested) compared to their corresponding laundered control samples after the 24-hour contact time. The treated samples were deemed to pass the Tier 1 screening for determining antimicrobial activity of treated articles.

Figure 6:
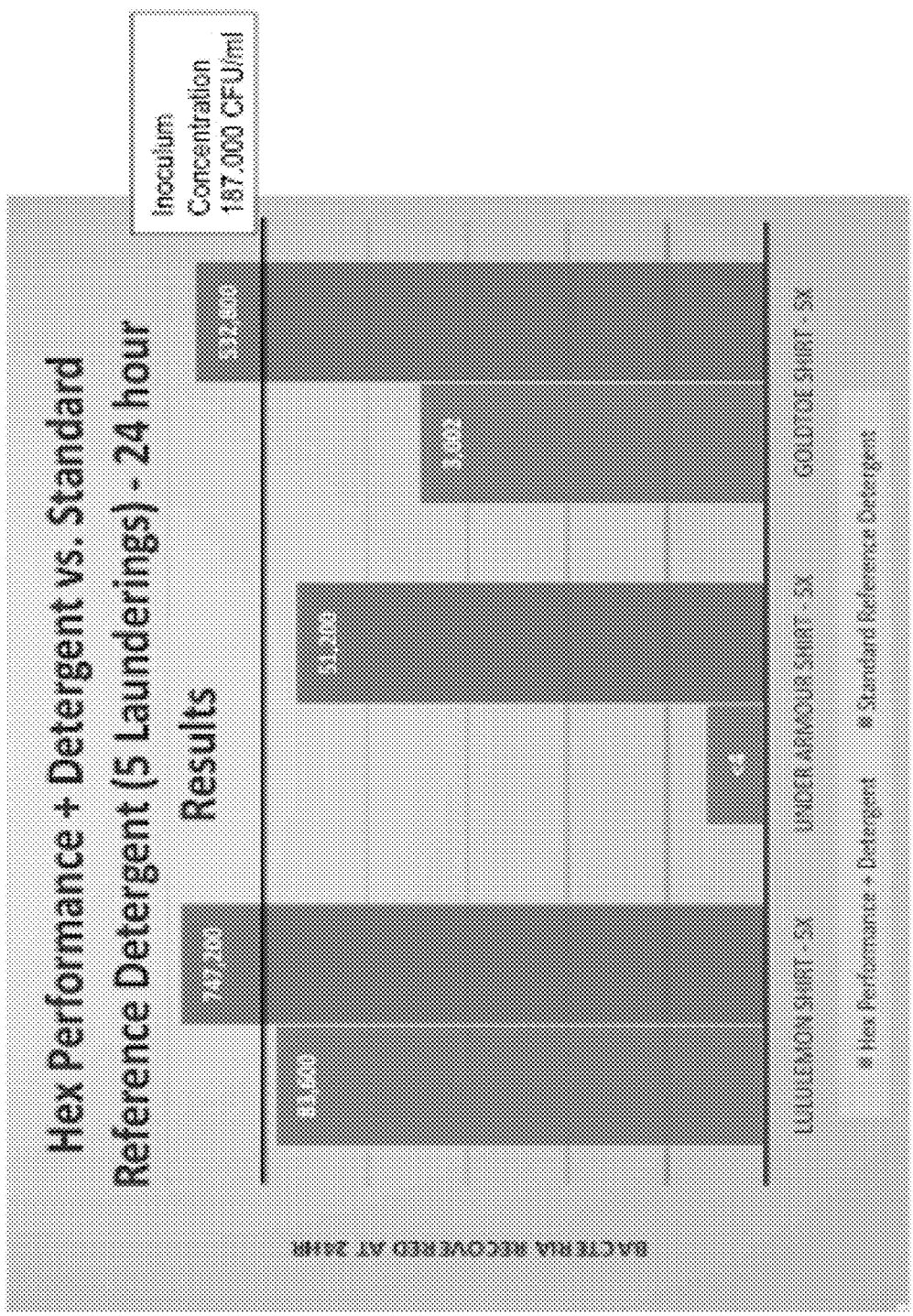
FIG. 6 illustrates, in bar chart format, the amount of bacteria found after 24 hours when laundered with Hex Performance+Detergent versus a standard reference detergent, per the testing performed for FIG. 5.

FIG. 6 illustrates, in bar chart format, the amount of bacteria found after 24 hours when laundered with Hex Performance+Detergent versus a standard reference detergent, per the testing performed for FIG. 5. The bar chart format of FIG. 6 helps to emphasize the efficiency with which Hex Performance+Detergent is better able to retard bacteria growth in the three types of fabrics, when compared to a standard reference detergent.

FIGS. 7A & 7B illustrate comparative soil removal data between Hex and one or more types of Tide detergent, according to an embodiment of the disclosure. The tests data shows that when Hex detergent is used in a 1:1 dose ratio of 57 milliliters (ml) relative to Tide Sport laundry detergent, the Hex detergent outperforms the Tide Sport detergent with respect to removal of common types of soilants, with the Tide Sport detergent removing about 98% as much soilants as the Hex detergent. When 30 ml of Hex detergent was used compared to 57 ml of Tide Sport, the Tide Sport detergent did fare better (Hex removing about 88%-94% of the amount of soilants), but only fractionally so relative to the different amounts used. When used at a 1:1 ratio relative to Tide Sport detergent, Hex detergent outperforms or is at parity with the Tide Sport detergent. Further, such testing did not factor in bacteria and/or odor control.

Continual use a washing agent in accordance with the above-discussed embodiments of the present systems and methods, with the addition of the protective agent, also in accordance with the above-discussed embodiments of the present systems and methods or the immediate application of the above-discussed on demand spray to a new (uncontaminated) product builds up a organosilane antimicrobial barrier on the fabric, or other material. In particular this repeated washing and treating process, and the barrier it creates imparts (cumulative) odor control. Thus, the present systems and methods provide a laundry system that will facilitate the cleaning of synthetic fabrics, such as those found in sports gear. Moreover, the present laundry systems will not degrade the wicking properties of such fabrics and will impede the adsorption/absorption of odor-causing microbes onto such fabrics during their use.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A method of forming a batch of a detergent, the method comprising the steps, performed in order, of:
   providing an amount of water;
   adding one or more soap-forming components to the water to form a base soap solution;
   providing an amount of propylene glycol to the base soap solution;
   providing at least one additional ingredient to the batch, the at least one additional ingredient not otherwise being comprised of either a fragrance or an antimicrobial; and
   adding a warm antimicrobial solution to the batch, the warm antimicrobial solution comprising an organosilane dissolved into water, the warm antimicrobial solution having at a temperature in a range of 80 F-120 F upon introduction to the batch, the organosilane being introduced to the batch in an amount so as to comprise no more than 5% by weight of the batch.

2. The method of claim 1, wherein the soap-forming components are comprised of at least one surfactant and at least one chelator.

3. The method of claim 1, wherein the at least one additional ingredient comprises an enzyme.

4. The method of claim 1, wherein the temperature of the warm antimicrobial solution is in the range of 90 F to 100 F upon introduction of the warm antimicrobial solution to the batch.

5. The method of claim 1, wherein the warm antimicrobial solution first is formed by dissolving the organosilane into the water, the warm antimicrobial solution being added to the batch thereafter.

6. The method of claim 1, wherein a total amount of the organosilane introduced comprises 0.05% to 1%, by weight, of the batch.

7. The method of claim 1, wherein the steps occurring after the step of providing water are performed under a level of agitation chosen so as to minimize any foam formation.

8. The method of claim 1, further comprising a step of adding a fragrance, the step of adding the fragrance occurring after the provision of the additional ingredients but prior to the addition of the warm antimicrobial solution to the batch.

9. The method of claim 1, wherein the soap-forming components, the propylene glycol, the at least one additional ingredient, and the warm antimicrobial solution are all bled into the batch at a rate chosen so as to minimize foam formation.

10. A method of forming a batch of a detergent, the method comprising the steps, performed in order, of:
    providing an amount of water;
    adding one or more soap-forming components to the water to form a base soap solution;
    providing an amount of propylene glycol to the base soap solution;
    providing at least one additional ingredient to the batch, the at least one additional ingredient not otherwise being comprised of either a fragrance or an antimicrobial; and
    adding a warm antimicrobial solution to the batch, the warm antimicrobial solution comprising an organosilane dissolved into water, the warm antimicrobial solution having at a temperature in a range of 80 F-120 F upon introduction to the batch, the organosilane being introduced to the batch in an amount so as to comprise no more than 5% by weight of the batch and so as to comprise a homogeneous solution of organosilane dissolved into water.

11. The method of claim 10, wherein the soap-forming components are comprised of at least one surfactant and at least one chelator.

12. The method of claim 10, wherein the at least one additional ingredient comprises an enzyme.

13. The method of claim 10, wherein the temperature of the warm antimicrobial solution is in the range of 90 F to 100 F upon introduction of the warm antimicrobial solution to the batch.

14. The method of claim 10, wherein the warm antimicrobial solution first is formed by dissolving the organosilane into the water, the warm antimicrobial solution being added to the batch thereafter.

15. The method of claim 10, wherein a total amount of the organosilane introduced comprises 0.05% to 1%, by weight, of the batch.

16. The method of claim 10, wherein the steps occurring after the step of providing water are performed under a level of agitation chosen so as to minimize any foam formation.

17. The method of claim 10, further comprising a step of adding a fragrance, the step of adding the fragrance occurring after the provision of the additional ingredients but prior to the addition of the warm antimicrobial solution to the batch.

18. The method of claim 10, wherein the soap-forming components, the propylene glycol, the at least one additional ingredient, and the warm antimicrobial solution are all bled into the batch at a rate chosen so as to minimize foam formation.

\* \* \* \* \*